(12) United States Patent
Benisty

(10) Patent No.: US 12,423,203 B2
(45) Date of Patent: Sep. 23, 2025

(54) HMB MULTI-SEGMENT OPTIMAL SELECTION

(71) Applicant: Sandisk Technologies, Inc., Milpitas, CA (US)

(72) Inventor: Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 175 days.

(21) Appl. No.: 17/958,182

(22) Filed: Sep. 30, 2022

(65) Prior Publication Data
US 2024/0111646 A1  Apr. 4, 2024

(51) Int. Cl.
*G06F 11/263* (2006.01)
*G06F 11/34* (2006.01)

(52) U.S. Cl.
CPC ........ *G06F 11/263* (2013.01); *G06F 11/3414* (2013.01); *G06F 11/3452* (2013.01)

(58) Field of Classification Search
CPC .............. G06F 11/263; G06F 11/3414; G06F 11/3452; G06F 11/2205; G06F 11/3423; G06F 2201/81
See application file for complete search history.

(56) References Cited

U.S. PATENT DOCUMENTS

| | | | |
|---|---|---|---|
| 10,102,135 B2 * | 10/2018 | Zaretsky | G06F 12/0871 |
| 10,108,371 B2 | 10/2018 | Nimmagadda et al. | |
| 10,712,949 B2 | 7/2020 | Hahn et al. | |
| 10,963,399 B2 | 3/2021 | Byun | |
| 11,403,011 B1 | 8/2022 | Gunda et al. | |
| 2017/0060476 A1 * | 3/2017 | Chinnakkonda Vidyapoornachary | G11C 7/04 |
| 2017/0102879 A1 * | 4/2017 | Benisty | G06F 12/0246 |
| 2019/0138220 A1 * | 5/2019 | Hahn | G06F 3/0611 |
| 2019/0294350 A1 | 9/2019 | Hahn et al. | |
| 2019/0311775 A1 * | 10/2019 | Kwon | G11C 29/12005 |
| 2021/0073404 A1 | 3/2021 | Sakata et al. | |
| 2021/0265003 A1 * | 8/2021 | Lee | G11C 29/42 |
| 2022/0012174 A1 | 1/2022 | Seok | |
| 2022/0027269 A1 | 1/2022 | Parry et al. | |
| 2023/0112869 A1 * | 4/2023 | Hwang | G06F 3/0683 711/154 |
| 2023/0152988 A1 * | 5/2023 | Lee | G06F 3/0637 711/154 |

* cited by examiner

*Primary Examiner* — Mark D Featherstone
*Assistant Examiner* — Rong Tang
(74) *Attorney, Agent, or Firm* — Patterson + Sheridan, LLP

(57) ABSTRACT

The present disclosure generally relates to improved host memory buffer (HMB) segment selection at the initialization phase. Rather than selecting an HMB segment strictly on one parameter, the selection process will consider multiple factors of the HMB segments. Instead of just selecting a HMB segments based on the size of the HMB segment, the data storage device will perform some basic performance measurements on the provided HMB segments before selecting HMB segments. The selection will be based also on the performance results from the various experiments. The experiments are performed in the initialization phase so the performance of the solid state drive (SSD) will not be impacted. The basic experiments include read, write, and mixed operations toward the HMB segments while measuring the performance and QoS.

18 Claims, 8 Drawing Sheets

| Bytes | Description |
|---|---|
| 15:0 | Host Memory Buffer Descriptor Entry 0 |
| 31:16 | Host Memory Buffer Descriptor Entry 1 |
| 47:32 | Host Memory Buffer Descriptor Entry 2 |
| 63:48 | Host Memory Buffer Descriptor Entry 3 |
| ... | ... |
| 16*n+15:16*n | Host Memory Buffer Descriptor Entry n |

FIG. 2

| Bytes | Description |
|---|---|
| 127:96 | Reserved |
| 95:64 | Buffer Size (BSIZE): Indicates the number of contiguous memory page size (CC.MPS) units for this descriptor. |
| 63:00 | Buffer Address (BADD): Indicates the host memory address for this descriptor aligned to the memory page size (CC.MPS). The lower bits (n:0) of this field indicate the offset within the memory page is 0h. If the memory page size is 4KB, then bits 11:00 shall be zero; if the memory page size is 8KB, then bits 12:00 shall be zero, etc. |

HMB MULTI-SEGMENT OPTIMAL SELECTION

BACKGROUND OF THE DISCLOSURE

Field of the Disclosure

Embodiments of the present disclosure generally relate to improved host memory buffer (HMB) segment selection at the initialization phase.

Description of the Related Art

The HMB feature in a data storage device allows a controller to utilize a designated portion of a host memory exclusively for the data storage device's purpose. The designated memory resources allocated on the host device are for the exclusive use of the controller (i.e., host software should not modify the ranges) until host software requests that the controller release the ranges. The controller is responsible for initializing the host memory resources.

The use of the host memory resources is vendor specific. According to the NVMe specification, the HMB has the following features. The HMB is allocated for controller's exclusive use. The data is guaranteed to be valid. The host device is obliged to notify the controller before any operation (e.g. in case of power loss, or in case the host device might need this buffer, etc. . . . ) which might lead to data loss. In such cases the host device must let the controller acknowledge the operation before the data is lost.

A HMB descriptor list on the host device typically maintains a listing of entries associated with host data buffers for exclusive use by the controller. During initialization, the host software may provide the HMB descriptor list to the storage device for exclusive use by the controller.

The HMB may comprise a plurality of segments, and the segments may amount to more segments or storage area than the controller can utilize. Hence, the controller would need to select HMB segments to use. In previous approaches, the selection of the HMB segments was based on the size of the HMB segments. If all segments had the same size, the first segments were selected. Internally, the data storage device can support a finite number of HMB segments (e.g. 16, 32 or 64) and a maximum HMB size (e.g. 64 MB or 128 MB). If the host device provides more HMB segments, the memory device will select and use some of the provided HMB segments with no qualifications for selection while the other HMB segments are not used. This leads to low performance and quality of service (QoS).

Therefore, there is a need in the art for improved HMB segment selection at the initialization phase.

SUMMARY OF THE DISCLOSURE

The present disclosure generally relates to improved host memory buffer (HMB) segment selection at the initialization phase. Rather than selecting an HMB segment strictly on one parameter, the selection process will consider multiple factors of the HMB segments. Instead of just selecting a HMB segments based on the size of the HMB segment, the data storage device will perform some basic performance measurements on the provided HMB segments before selecting HMB segments. The selection will be based also on the performance results from the various experiments. The experiments are performed in the initialization phase so the performance of the solid state drive (SSD) will not be impacted. The basic experiments include read, write, and mixed operations toward the HMB segments while measuring the performance and QoS.

In one embodiment, a data storage device comprises: a memory device; and a controller coupled to the memory device, wherein the controller is configured to: receive a HMB descriptor list from a host device, wherein the HMB descriptor list includes a plurality of HMB segments; test at least one HMB segment of the plurality of HMB segments; and select HMB segments of the plurality of HMB segments to comprise a HMB, wherein the selecting is based upon results of the testing.

In another embodiment, a data storage device comprises: a memory device; and a controller coupled to the memory device, wherein the controller is configured to: ranking a plurality of HMB segments, wherein the ranking is from best to worst for a predetermined application; select at least one HMB segment from the plurality of HMB segments; aggregate the selected at least one HMB segment together to create a HMB; and store data in the HMB.

In another embodiment, a data storage device comprises: memory means; and a controller coupled to the memory means, wherein the controller is configured to: receive a HMB descriptor list from a host device, wherein the HMB descriptor list includes a plurality of HMB segments; test the plurality of HMB segments to generate performance measurements; store the performance measurements in a table; select multiple HMB segments from the plurality of HMB segments; and utilize the selected multiple HMB segments as a HMB.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 is a table of an HMB descriptor list, according to certain embodiments.

FIG. 3 is a table of an HMB descriptor entry, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to improved host memory buffer (HMB) segment selection at the initialization phase. Rather than selecting an HMB segment strictly on one parameter, the selection process will consider multiple factors of the HMB segments. Instead of just selecting a HMB segments based on the size of the HMB segment, the data storage device will perform some basic performance measurements on the provided HMB segments before selecting HMB segments. The selection will be based also on the performance results from the various experiments. The experiments are performed in the initialization phase so the performance of the solid state drive (SSD) will not be impacted. The basic experiments include read, write, and mixed operations toward the HMB segments while measuring the performance and QoS.

Figure 1:
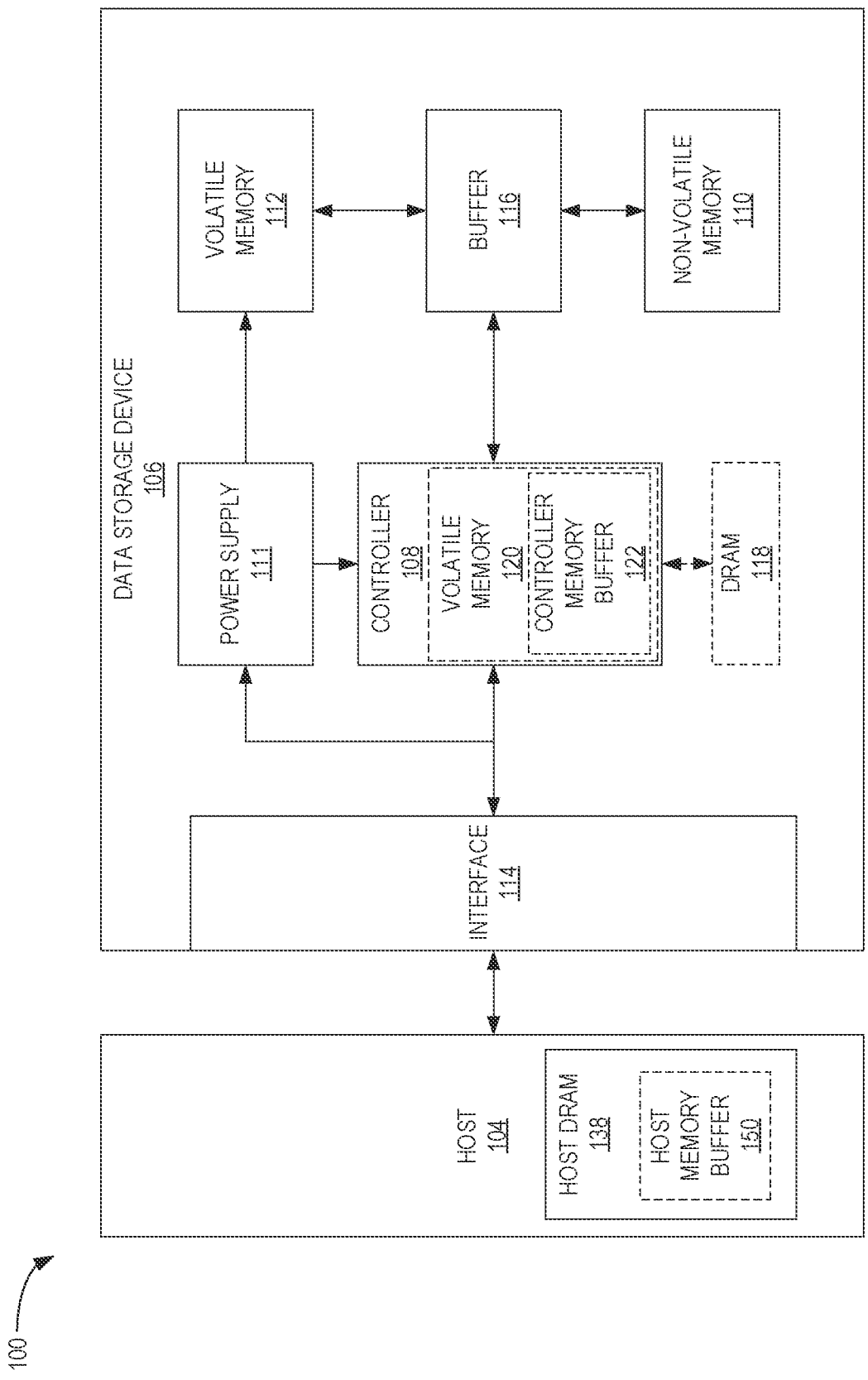
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a HMB 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

FIG. 2 is a table of an HMB descriptor list 200, according to certain embodiments. The HMB descriptor list 200 is provided by the host device. Each 16 Bytes entry represents a single host buffer. The table must not be modified until the buffers have been released by the host device.

FIG. 3 is a table of an HMB descriptor entry 300, according to certain embodiments. The structure of each entry in the HMB descriptor list 200, per the NVMe standard is shown in HMB descriptor entry 300. Each entry contains the address of the data buffer and the size of said data buffer, which is represented in Memory Page Size (MPS) granularity. The host MPS is a global parameter which should be represented as a $2^N$ value, whose minimum value is 4 KB and the maximum value is 128 MB. The device back end (BE) refers to the HMB as a single contiguous buffer and it is under the device front end (FE) responsibility to manage the fragmentations if such exist on the memory space of the host.

Figure 4:
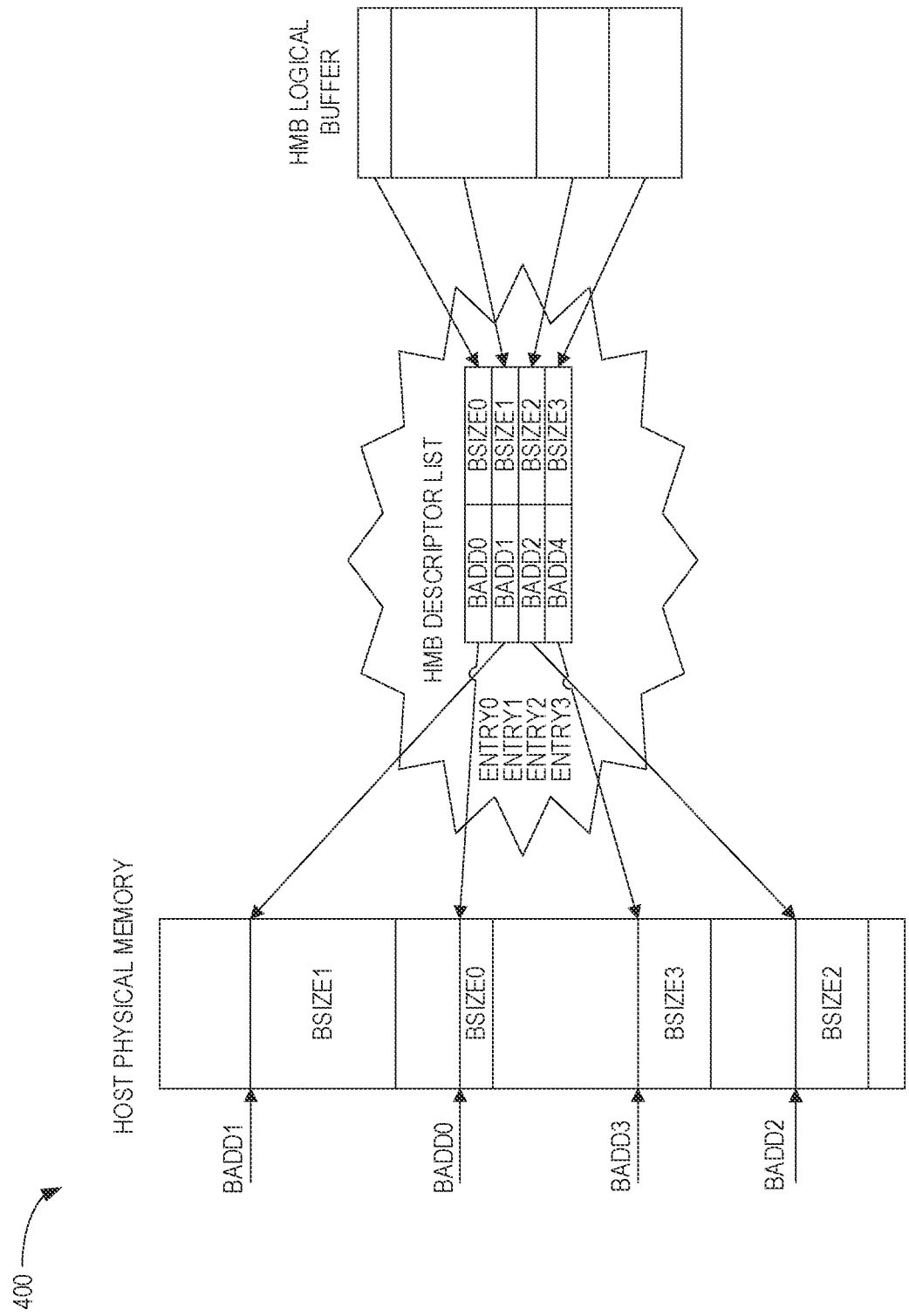
FIG. 4 is an exemplary illustration of mapping a host physical memory and HMB logical buffer based on a HMB descriptor list, according to certain embodiments.

FIG. 4 is an exemplary illustration of mapping 400 a host physical memory and HMB logical buffer based on a HMB descriptor list, according to certain embodiments. In FIG. 4 the host physical memory (left side of FIG. 4), the HMB logical buffer (right side of FIG. 4), and the mapping between the two are shown. The HMB descriptor list is also shown. The host physical memory of designated data buffers allocated on the host may be non-continuous (fragmented)

on the host memory. The device BE handles the HMB as a contiguous buffer. The device FE is responsible for mapping the HMB logical buffer to the host physical memory using the HMB descriptor list which is stored in the host memory.

Figure 5:
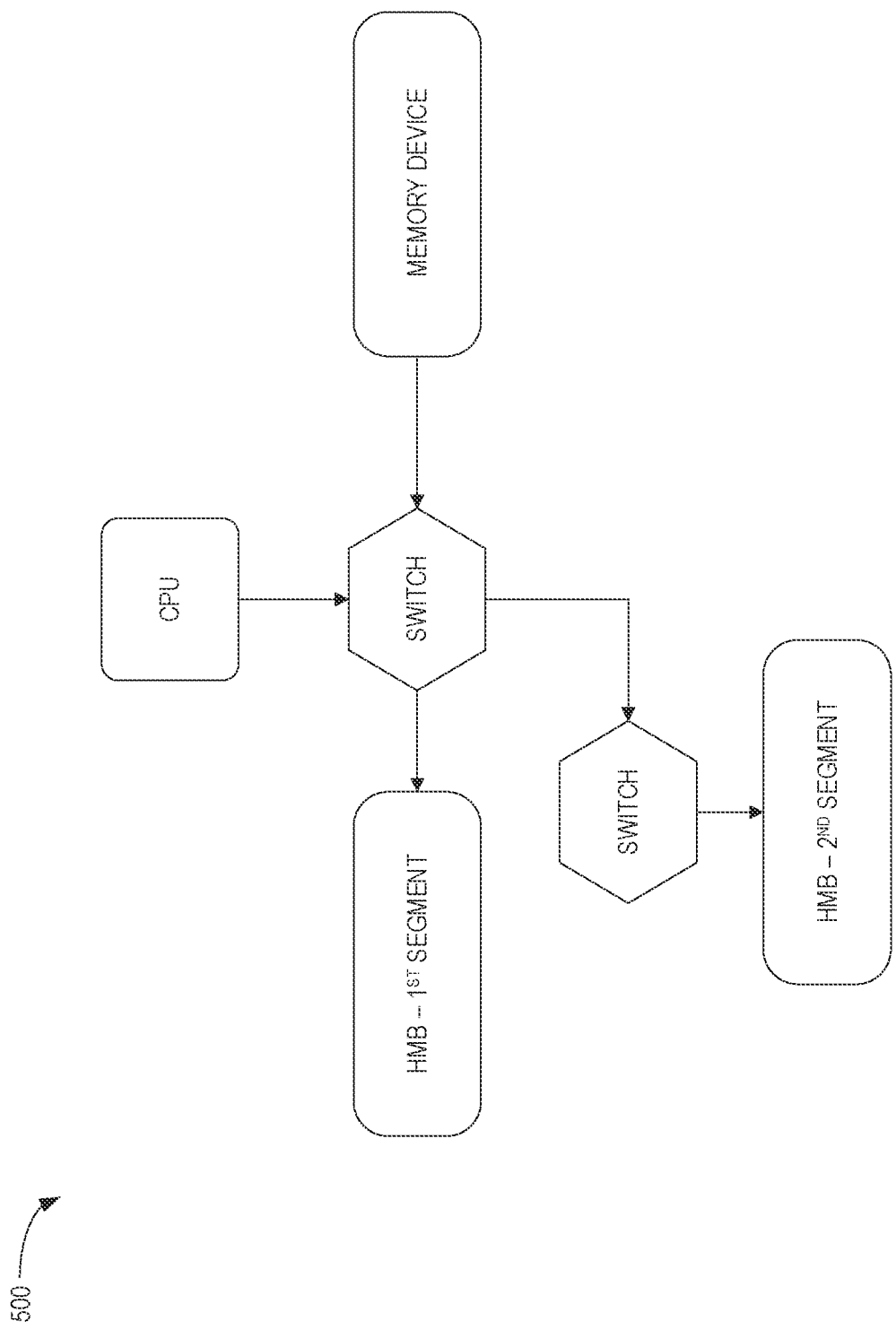
FIG. 5 is a schematic block diagram illustrating HMB segments with different performance attributes, according to certain embodiments.

FIG. 5 is a schematic block diagram 500 illustrating HMB segments with different performance attributes, according to certain embodiments. It is to be understood that though a first HMB segment and a second HMB segment are shown, there may be more or less HMB segments. Furthermore, it is to be understood while only two switches are shown, there may be more or less switches when accessing a HMB segment. Two HMB segments are provided while both the first HMB segment and the second HMB segment access attributes are not the same. As can be shown, when the memory device accesses the first HMB segment, the first HMB segment only needs to pass through a single switch. Conversely, when the memory device has to access the second HMB segment, the memory device has to pass through two switches. When accessing the second HMB segment, the access latency is higher. In previous approaches, the storage device is unaware of how many switches that may need to be passed to access a specific HMB segment. However, this is a very important parameter that could be easily detected by performing a simple experiment.

Figure 6:
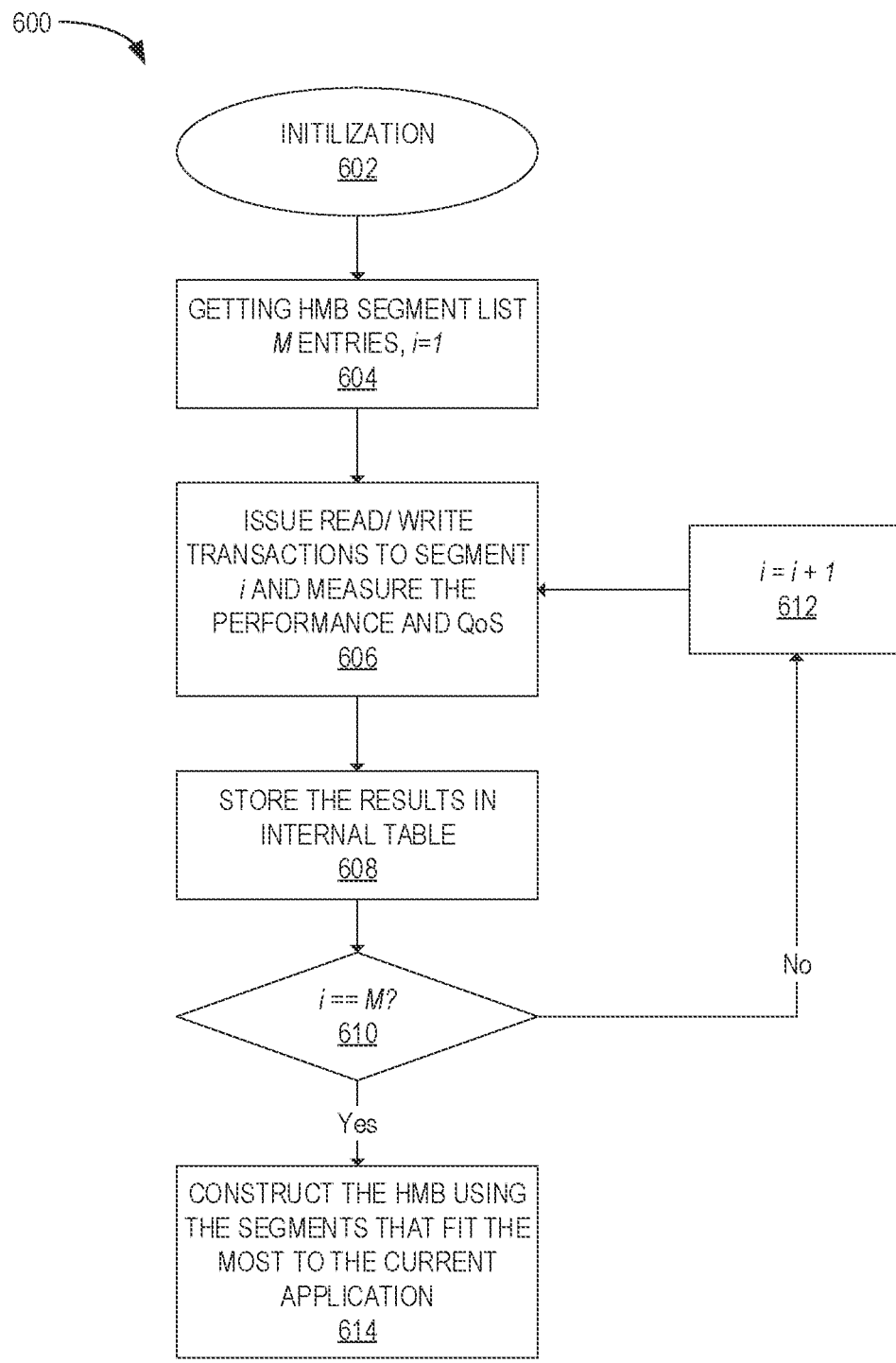
FIG. 6 is a flow chart illustrating HMB segment selection, according to certain embodiments.

FIG. 6 is a flow chart 600 illustrating HMB segment selection, according to certain embodiments. Flow chart 600 illustrates the flow implemented by the device controller when selecting the best HMB segments. The flow starts in the initialization phase. The host device provides the list of HMB segments to the device. The list contains M entries. The data storage device scans the list and issues an experiment to each segment. The data storage device issues read, write, and mixed workloads and then measures the performance and QoS in several scenarios (e.g. different transaction size, queue depth, etc.). All the results are stored in an internal table. Finally, the firmware (FW) implemented in the data storage device selects the HMB segments which leads to the maximum SSD performance and QoS results.

At block 602, the process begins with the initialization phase. At block 604, the data storage device retrieves the HMB segment list with M entries. The HMB entries are designated i and is initially set to 1 (i.e., i=1). The M represents the total number of HMB segments. At block 606, controller issues read/write transactions to the HMB segments so the performance and QoS can be measured for each HMB segment on the HMB segment list. At block 608, the process proceeds with storing the results for each transaction sent to each HMB segment in an internal table. At block 610, the controller determines if i=M. If i≠M then the process will proceed to block 612. At block 612, i is increased (i.e., i=i+1) and returns to block 606. If i=M at block 610, then the process will proceed to block 614. At block 614, the controller constructs the HMB using the HMB segments that most fit the current application.

Figure 7:
FIG. 7 is a table of HMB segment attributes, according to certain embodiments.

FIG. 7 is a table 700 of HMB segment attributes, according to certain embodiments. The table 700 holds the provided HMB segments, the base address, the size and the performance results for each HMB segment. The performance results include the read performance, read latency, write performance and mixed workload performance. Once collecting performance results, the FW scans the table 700 and selects the HMB segments that will lead to maximum SSD performance and QoS.

Figure 8:
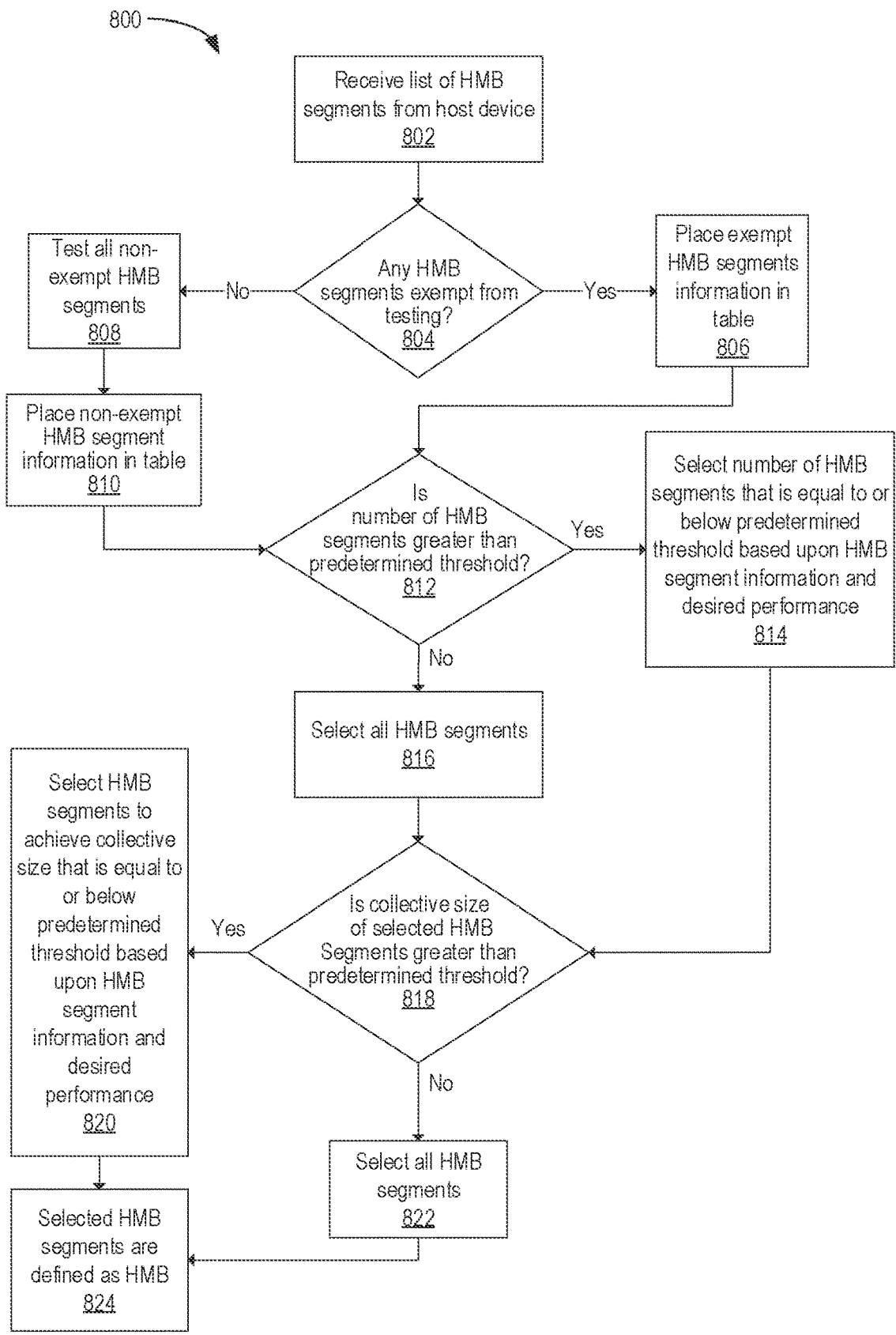
FIG. 8 is a flow chart illustrating HMB segment selection, according to certain embodiments.

FIG. 8 is a flow chart 800 illustrating HMB segment selection, according to certain embodiments. The flow chart 800 describes the flow implemented by the device controller when selecting the best HMB segments. The flow starts in the initialization phase. The host device provides the list of HMB segments to the device. The data storage device scans the list and issues an experiment to each segment. It is to be understood that a list of experiments have been listed but are not limited to the list of experiments. For instance, the read performance is measured in several scenarios with different parameters (e.g. different packet size, random vs. sequential accesses, different number of outstanding requests, etc.). In other instances the storage device may decide to skip the experiments for a specific HMB segment due to the specific HMB segment size (too small) or already have the list of segments that will provide sufficient performance results. The data storage device issues read, write, and mixed workloads and then measures the performance and QoS in several scenarios (e.g. different transaction size, queue depth, etc.). Additionally, several algorithms could be implemented in the data storage device for selecting the HMB segments. One embodiment could be focused on read performance while other embodiments on mixed performance. In another embodiment, the table may also contain a score result column while ranking the HMB segments from best to worst for a specific application. All the results are stored in an internal table. Finally, the FW implemented in the storage device selects the HMB segments which lead to the maximum SSD performance and QoS results.

The process begins at block 802 when the list of HMB segments is received from the host device. At block 804, a determination is made regarding whether any HMB segments are exempt from testing. If the determination is yes, then the process proceeds to block 806. At block 806, the exempt HMB segments information is placed in the table 700. If the determination is no at block 804, then the process proceeds to block 808. At block 808, the controller tests all non-exempt HMB segments. A test can be focused on read performance while other tests focused on mixed performance. At block 810, the non-exempt HMB segments information is placed in table 700. For some instances the information stored in table 700 may contain a score result column while ranking the segments from best to worst for a specific application. After either block 806 or block 810 are completed the process proceeds to block 812.

It is to be understood that while block 812 is shown to be completed before block 818, it is contemplated that block 818 can be completed before block 812. The process can determine whether the collective size of the selected HMB segments is greater than a predetermined threshold before determining whether the number of HMB segments is greater than a predetermined threshold.

At block 812, the controller determines whether the number of HMB segments is greater than the predetermined threshold. If the number of HMB segments is greater than the predetermined threshold, then the process proceeds to block 814. At block 814, the controller selects the number of HMB segments that are equal or below the predetermined threshold. The predetermined threshold at block 812 is based upon the HMB segment information and desired performance. If the controller determines the number of HMB segments is not greater than the predetermined threshold, then the process proceeds to block 816. At block 816, controller selects all HMB segments. After either block 814 or block 816 are completed, the process proceeds to block 818.

At block 818, the controller determines whether the collective size of the selected HMB segments is greater than the predetermined threshold. If the controller determines the collective size of the selected HMB segments is greater than the predetermined threshold, then the process proceeds to block 820. At block 820, the controller selects the number of HMB segments to achieve a collective size that is equal to or below the predetermined threshold. The predetermined threshold at block 818 is based upon the HMB segment information and desired performance. If the controller determines the collective size of the selected HMB segments is not greater than the predetermined threshold, then the process proceeds to block 822. At block 822, the controller selects all HMB segments. After either block 820 or block 822 are completed, the process proceeds to block 824. At block 824, the selected HMB segments are defined as the HMB.

By implementing a smarter selection at the initialization phase that helps the device to select the best segments, QoS is increased. Additionally, the access latency for the HMB is reduced when experiments are sent to each HMB segment before potential selection.

In one embodiment, a data storage device comprises: a memory device; and a controller coupled to the memory device, wherein the controller is configured to: receive a HMB descriptor list from a host device, wherein the HMB descriptor list includes a plurality of HMB segments; test at least one HMB segment of the plurality of HMB segments; and select HMB segments of the plurality of HMB segments to comprise a HMB, wherein the selecting is based upon results of the testing. At least one additional HMB segment of the plurality of HMB segments is not tested. The controller includes test results for at least one additional HMB segment prior to performing the testing. The testing comprises measuring read performance. The read performance is measured using packet size, random sequential accesses, different number of outstanding requests, and combinations thereof. The controller is configured to maintain a HMB segment attributes table comprising results of the testing. The table comprises the following information for each HMB segment of the plurality of segments: size, read performance, read latency, write performance, and mixed workload performance. The controller is configured to: store results of the testing in an internal table; determine whether additional HMB segments need to be tested; and test the additional HMB segments. The plurality of HMB segments comprises a number of HMB segments that is greater than a predetermined maximum number of HMB segments for the HMB. The plurality of HMB segments collectively comprises a size that is greater than a predetermined size for the HMB.

In another embodiment, a data storage device comprises: a memory device; and a controller coupled to the memory device, wherein the controller is configured to: ranking a plurality of HMB segments, wherein the ranking is from best to worst for a predetermined application; select at least one HMB segment from the plurality of HMB segments; aggregate the selected at least one HMB segment together to create a HMB; and store data in the HMB. Less than all HMB segments are aggregated together to create the HMB. The ranking comprises performing performance experiments on at least one of the plurality of HMB segments. At least one other HMB segment is not tested. The at least one other HMB segment has a size less than or equal to a predetermined threshold. The controller is further configured to: scan a HMB descriptor list; and issue experiments to each HMB segment. The experiments are performed during an initialization phase.

In another embodiment, a data storage device comprises: memory means; and a controller coupled to the memory means, wherein the controller is configured to: receive a HMB descriptor list from a host device, wherein the HMB descriptor list includes a plurality of HMB segments; test the plurality of HMB segments to generate performance measurements; store the performance measurements in a table; select multiple HMB segments from the plurality of HMB segments; and utilize the selected multiple HMB segments as a HMB. The controller is further configured to range the plurality of HMB segments based upon the generated performance measurements. The testing comprises determining transaction size and/or queue depth and measuring performance and quality of service based upon the transaction size and/or queue depth.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory device; and
a controller coupled to the memory device, wherein the controller is configured to:
  receive a host memory buffer (HMB) descriptor list from a host device, wherein the HMB descriptor list includes a plurality of HMB segments;
  designate each of the plurality of HMB segments as a non-exempt HMB segment or an exempt HMB segment, wherein a non-exempt HMB segment has a size less than a first threshold or a performance less than a second threshold;
  determine which of the non-exempt HMB segments to select for a HMB, wherein the determining comprises:
    testing a performance of each of the non-exempt HMB segments, wherein the exempt HMB segments are not tested, wherein the performance is a measurement of latency and speed of read or write operations to the non-exempt HMB segment; and
    based on results of the testing, selecting one or more non-exempt HMB segments to comprise the HMB, wherein;
      the HMB comprises a number of non-exempt HMB segments less than or equal to a predetermined maximum number of HMB segments for the HMB;
      exempt HMB segments are not included in the HMB;
      the HMB has a performance greater than or equal to the second threshold; and
      a collective size of the HMB is less than or equal to a predetermined size for the HMB; and
    define the one or more non-exempt HMB segments selected as the HMB.

2. The data storage device of claim 1, wherein at least one additional HMB segment of the plurality of HMB segments included on the HMB descriptor list is not tested.

3. The data storage device of claim 1, wherein the controller includes test results for at least one additional HMB segment prior to performing the testing.

4. The data storage device of claim 1, wherein the controller is configured to maintain a HMB segment attributes table comprising results of the testing.

5. The data storage device of claim 4, wherein the HMB segment attributes table comprises the following information for each HMB segment of the plurality of HMB segments included on the HMB descriptor list: size, read performance, read latency, write performance, and mixed workload performance.

6. The data storage device of claim 1, wherein the controller is configured to:
   store results of the testing in an internal table;
   determine whether additional HMB segments need to be tested; and
   test the additional HMB segments.

7. The data storage device of claim 1, wherein the plurality of HMB segments included on the HMB descriptor list comprises a number of HMB segments that is greater than a predetermined maximum number of HMB segments for the HMB.

8. The data storage device of claim 1, wherein the controller is further configured to reselect another one or more non-exempt HMB segments from the plurality of HMB segments to comprise a second HMB, wherein the reselecting is based on a determination that the collective size of the HMB is greater than the predetermined size for the HMB, wherein the another one or more non-exempt HMB segments are separate and distinct from the one or more non-exempt HMB segments associated with the HMB.

9. A data storage device, comprising:
   a memory device; and
   a controller coupled to the memory device, wherein the controller is configured to:
      designate each of a plurality of host memory buffer (HMB) segments as a non-exempt HMB segment or an exempt HMB segment, wherein a non-exempt HMB segment has a size less than a first threshold or a performance less than a second threshold;
      determine which of the non-exempt HMB segments of the plurality of HMB segments to select to create a HMB, wherein the determining comprises:
         testing a performance of each of the non-exempt HMB segments, wherein the exempt HMB segments are not tested, wherein the performance is a measurement of latency and speed of read or write operations to the non-exempt HMB segment; and
         selecting one or more non-exempt HMB segments to create the HMB, wherein the selecting is based upon results of the testing;
      aggregate the selected one or more non-exempt HMB segments together to create the HMB, wherein;
         the HMB comprises a number of non-exempt HMB segments less than or equal to a predetermined maximum number of HMB segments for the HMB;
         exempt HMB segments are not included in the HMB;
         the HMB has a performance greater than or equal to the second threshold; and
         a collective size of the HMB is less than or equal to a predetermined size for the HMB;
      rank the non-exempt HMB segments tested based on requirements for a specific application;
      store the ranking of the non-exempt HMB segments tested in a HMB segment attributes table; and
      store data in the HMB.

10. The data storage device of claim 9, wherein less than all of the non-exempt HMB segments are aggregated together to create the HMB.

11. The data storage device of claim 9, wherein the ranking comprises performing performance experiments on at least one of the plurality of HMB segments.

12. The data storage device of claim 11, wherein at least one other HMB segment is not tested.

13. The data storage device of claim 12, wherein the at least one other HMB segment has a size less than or equal to the first threshold.

14. The data storage device of claim 9, wherein the controller is further configured to:
   scan a HMB descriptor list; and
   issue experiments to each HMB segment.

15. The data storage device of claim 14, wherein the experiments are performed during an initialization phase.

16. The data storage device of claim 9, wherein the HMB segments of the HMB are non-continuous.

17. A data storage device, comprising:
   memory means; and
   a controller coupled to the memory means, wherein the controller is configured to:
      receive a host memory buffer (HMB) descriptor list from a host device, wherein the HMB descriptor list includes a plurality of HMB segments;
      designate each of the plurality of HMB segments as a non-exempt HMB segment or an exempt HMB segment, wherein a non-exempt HMB segment has a size less than a first threshold or a performance less than a second threshold;
      determine which of the non-exempt HMB segments to utilize as a HMB, wherein the determining comprises:
         testing a performance of each of the non-exempt HMB segments to generate performance measurements, wherein the exempt HMB segments are not tested, wherein the performance is a measure of latency and speed of read or write operations to the non-exempt HMB segment; and
         determining whether the non-exempt HMB segments comprises a number of HMB segments less than or equal to a predetermined maximum number of HMB segments for the HMB;
         if the number is greater Than the predetermined maximum number of HMB segments for the HMB, selecting multiple HMB segments from the non-exempt HMB segments, wherein the selecting is based upon results from the testing; and
         if the number is less than or equal to the predetermined maximum number of HMB segments for the HMB, selecting all non-exempt HMB segments of the plurality of HMB segments;
      utilize the selected non-exempt HMB segments as the HMB, wherein:
         the HMB comprises a number of HMB segments less than or equal to a predetermined maximum number of HMB segments for a HMB;
         the HMB has a performance greater than or equal to the second threshold; and
         exempt HMB segments are not included in the HMB;
         a collective size of the HMB is less than or equal to a predetermined size for the HMB;
      rank the non-exempt HMB segments tested based on requirements for a specific application; and
      store the ranking of the non-exempt HMB segments tested in a HMB segment attributes table.

18. The data storage device of claim 17, wherein the testing comprises determining transaction size or queue depth, and measuring performance and quality of service based upon the transaction size or the queue depth.

* * * * *